Dec. 1, 1970  E. J. HELM ET AL  3,544,329
ELECTROLYSIS OF FERMENTED BEVERAGES
Filed Aug. 1, 1967
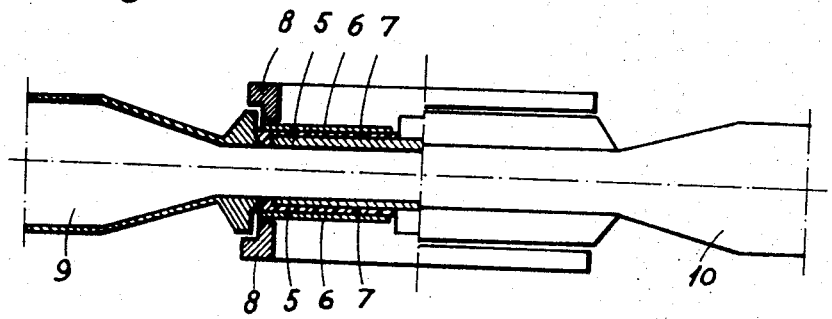
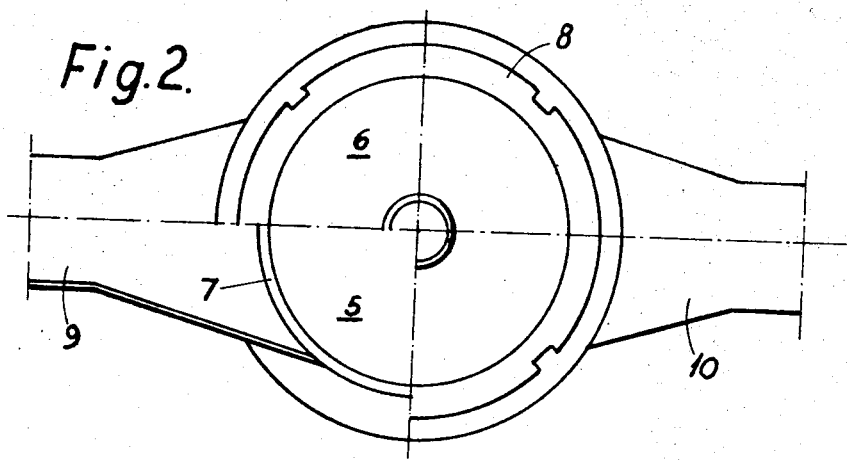

United States Patent Office 3,544,329
Patented Dec. 1, 1970

3,544,329
ELECTROLYSIS OF FERMENTED BEVERAGES
Erik Johannes Helm, Klampenborg, and Richard Stanley Wrey Thorne, Holte, Denmark, assignors to Alfred Jorgensen Gaeringsfysiologisk Laboratorium A/S (Alfred Jorgensen, Laboratory for Fermentation Ltd.), Copenhagen, Denmark, a firm
Filed Aug. 1, 1967, Ser. No. 657,687
Int. Cl. C12h 1/10
U.S. Cl. 99—48                    6 Claims

ABSTRACT OF THE DISCLOSURE

To improve the flavour of fermented beverages by elimination of hydrogen sulphide produced during fermentation, small quantities of copper are added by means of electrolytic dissolution. Means for the electrolytic dissolution are also disclosed.

---

This invention relates to a method and means for the improvement of the flavour of fermented beverages, such as beers, ciders, and wines, by elimination of hydrogen sulphide produced during fermentation.

Hydrogen sulphide is a normal product of yeast metabolism; during fermentation of beverages such as beer it is produced from cysteine by desulphuration and from inorganic sulphate by reduction, and probably from other precursors as well. It is well known to brewers that beer, and particularly newly fermented beer, for this reason often contains so much hydrogen sulphide as seriously to impair its flavour, and especially its aroma. Generally speaking, this circumstance applies both to bottom-fermented beers (pilsner and lager types) and to top-fermented beers (ale and stout types).

This hydrogen sulphide may disappear during the maturation of beer, a process which consists essentially of a slow secondary fermentation, the hydrogen sulphide being swept out of the beer by the slowly evolving carbon dioxide. In practice, however, it is often found that for one reason or another the finished beer still retains a sensible concentration of hydrogen sulphide; particularly in the case of pilsner type beers this residual hydrogen sulphide may be sufficient to detract from the delicacy of their flavour.

The concentration of hydrogen sulphide in finished beers may vary from inappreciable traces up to about 0.06 p.p.m. Its presence is already perceptible at a concentration of about 0.005 p.p.m.; at this level it is hardly perceived as such, but rather as modifying the general beer aroma. At 0.005 to 0.02 p.p.m. its odour has been described as "yeasty" or "sulphury," i.e. more or less abnormal and undesirable. At about 0.05 p.p.m. it is recognizable as the characteristic hydrogen sulphide stench. Thus, while very low concentrations of hydrogen sulphide, say, less than 0.005 p.p.m. may not be objectionable in beer, and may even contribute a desirable element to its aroma, higher levels than this are definitely undesirable and perceived as a defect.

Accordingly, a process for the elimination of hydrogen sulphide from beer or its reduction to an imperceptible level, a process which might help to abbreviate the economically expensive secondary fermentation, is much to be desired.

The extremely low solubility product of copper sulphide suggests that a very simple means to this end might be to dose small quantities of, for example copper sulphate into beer so as to precipitate all of its hydrogen sulphide in the form of copper sulphide which would be subsequently removed during the regular beer filtration prior to bottling. However, the fact that beers normally contain traces of copper of the order of 0.1 p.p.m. or more which are as a rule more than equivalent to the amount of hydrogen sulphide to be removed, without any such removal actually taking place, suggests that the problem is not quite so simple as it may at first sight appear. It is true that the addition of an excess of copper sulphate to beer, of the order of 1 p.p.m. of copper, does indeed remove all perceptible hydrogen sulphide from it, but the relatively high concentration of residual copper remaining in the beer constitutes such a technical disadvantage that this procedure could not be seriously advocated for practical use. The drawback attaching to soluble copper in beer is that it rather drastically reduces the stability ("shelf-life") of the beer: copper accelerates the precipitation of proteinaceous material from the beer, rendering it cloudy and unsaleable. Presumably, the small amount of copper normally present in beer is already complexed to proteinaceous material in the beer so that it is unavailable for precipitating the hydrogen sulphide. Similarly, the excessive amount of copper sulphate which is necessary to eliminate hydrogen sulphide from beer must be attributed to most of the copper immediately being complexed, only a minor amount being available to react with the hydrogen sulphide.

The present invention comprises dosing suitably small quantities of copper into beer by means of electrolytic dissolution. Trials have shown that by this procedure the hydrogen sulphide may be removed from beer without causing any appreciable increase in its copper content.

According to this invention, beer, during the course of its passage to the filter, is passed between two electrodes of electrolytic copper, or between two electrodes one of which, the anode, is of electrolytic copper. By the application of a suitable electromotive force across the electrodes copper passes into solution into the beer; the concentration of copper so dissolved depends only upon (a) the quantity of electricity passing through the beer (measured by the product of current strength and time), and (b) the velocity of the beer flowing past the electrodes. Copper dissolution is therefore precisely controllable by regulating current strength in relation to beer velocity.

As an example, some results obtained with a small laboratory prototype apparatus will be quoted. Electrodes of electrolytic copper with an effective area of 1.9 cm.$^2$ and separation of 1.2 cm. were mounted against plastic washers on either side of an electrolytic cell constructed of perspex. By the application of $CO_2$ pressure the beer to be treated was caused to flow past these electrodes with a velocity of 3.04 ml. per second. Application of an electromotive force of about 1.5 volts gave a current of 360 microamperes through the flowing beer. From Faraday's second law of electrolysis it follows that this current strength and beer velocity should cause the dissolution of 0.039 mg. copper per litre of beer. From the point of view of beer stability this concentration of copper is quite insignificant; it is nevertheless enough to remove all or most of the perceptible hydrogen sulphide from the beer, as will be shown below. (In fact, 0.039 p.p.m. copper is equivalent to 0.021 p.p.m. hydrogen sulphide.) Subsequent replicate analyses of the unfiltered beer for copper confirmed, within the limits of experimental error ($\pm 0.006$ p.p.m.), that the amount of copper dosed into the beer did not exceed that calculated from the current strength and beer velocity. Similar analyses made on the filtered beer (steri-filtered to remove fine particles) showed an even smaller increment of copper, consonant with the view that some or all of the electrolytically dosed copper had been converted to copper sulphide which was removed by the filtration.

Two sets of trials will be quited to show the efficacy of this procedure in removing hydrogen sulphide from beer. In the first set, beers were given a preliminary dosage of small amounts of sodium sulphide in order to raise their hydrogen sulphide contents to a level somewhat higher than anything likely to be encountered in practice. A portion of each of these beers was then treated electrolytically with copper in the manner just described, the remainder being used as a control. Samples of the control beer and of the same beer treated electrolytically were then presented pairwise and randomised to a panel of expert tasters. The tasters, who had been instructed beforehand as to what difference to look for between the samples in each pair, were required to state which member of each pair had, in their judgement, been treated for the removal of hydrogen sulphide. Of 55 judgements made by up to 5 tasters on 14 different pairs of beer samples, 49 judgements were correct, 2 were wrong, while the remaining 4 judgements did not discriminate between the samples. According to standard statistical tables for evaluating the significance of such taste tests, there is an overwhelming probability (+++ statistical significance, or more than 99.9% probability) that the electrolytic treatment had in fact produced the intended effect.

The second set of trials was more stringent in that beers were used without any preliminary addition of sodium sulphide to raise their hydrogen sulphide level artificially; in several of these beers the presence of hydrogen sulphide, even to a keen nose, was only doubtfully evident. Of 63 judgements made by the same 5 tasters on 28 samples of commercial beers, 45 judgements were correct, 10 were wrong, while 8 were indenterminate. Though the level of discrimination was thus lower than in the first set, as was to be expected, the result nevertheless retains +++ statistical significance, showing that the electrolytic treatment certainly leads to improvement of the beer.

For assessing the efficacy of electrolysis treatment in removing perceptible hydrogen sulphide from beer, taste tests were used in preference to chemical analyses for the following reasons. Firstly, taste tests are more relevant, in that they are essentially identical with the type of judgement actually made by the beer consumer. And secondly, the chemical method hitherto used for estimating traces of hydrogen sulphide in beer has recently been shown to be unreliable, especially when the beers to be analysed contain varying concentrations of copper.

Since the hydrogen sulphide in beer cannot be directly estimated with sufficient accuracy, the effect of copper electrolysis on sulphide content was estimated indirectly by collecting on to filters the copper sulphide formed during electrolysis and estimating the increase of their copper content. For this purpose a small excess of hydrogen sulphide was added to the experimental beers before electrolysis to ensure that the copper added electrolytically would have enough material to react with. The following table shows the amounts of copper added electrolytically (calculated precisely from measurements of current strength and time) and the amounts of copper by analysis recovered on the filters (all figures are p.p.m. in beer).

| Experiment: | Copper added electro-lytically | Copper recovered on filters | Percent recovery |
|---|---|---|---|
| 1 | 1.08 | 1.01 | 93 |
| 2 | 1.06 | 0.89 | 84 |
| 3 | 1.43 | 1.33 | 93 |
| 4 | 0.88 | 0.86 | 98 |
| 5 | 0.96 | 0.66 | 69 |
| 6 | 0.98 | 0.67 | 68 |
| 7 | 1.26 | 0.96 | 76 |
| 8 | 0.97 | 0.87 | 90 |
| 9 | 0.47 | 0.30 | 64 |
| 10 | 0.53 | 0.72 | 136 |
| | 0.96 | 0.83 | 87±7 |

Thus, nearly all the copper added by electrolysis reacts with the hydrogen sulphide present in the beer so that electrolysis, provided it is not excessive, should give no appreciable increase in the copper content of the beer. This has been confirmed by copper analyses on electrolysed and control beers in practical brewing trials; the average difference of copper content between such pairs was $0.03 \pm 0.03$ p.p.m., an amount which is significant neither statistically nor in practice.

For the practical treatment of beers the method here adumbrated has the important merit that simply by regulating the current strength, up or down, it can be made to cope with whatever concentration of hydrogen sulphide may be present in the beer without sensibly increasing the final copper content of the latter, and therefore without impairing its stability.

An electrolytic cell for practical use must be capable of dosing the required amount of copper into beer which is flowing past the electrodes with a velocity of, for example, 1 or 2 litres per second (36 to 72 hectolitres per hour). It has been found empirically that this can be achieved by increasing the area of the electrodes to about 200 cm.$^2$ (with a separation of about 2.5 cm. between them) and by increasing the electromotive force across them to about 5 volts. The electrolytic treatment of a flowing electrolyte, in this case beer, appears to be more efficient than that of a static electrolyte. This may be due partly to an unexpected diminution of the electrical resistance of the electrolyte as the applied electromotive force increases, and partly to a continuous removal of the electrical double layer by the rapidly flowing electrolyte.

An embodiment of an electrolytic cell is shown in the accompanying drawings, where:

FIG. 1 is a partly sectional elevation of the cell, and

FIG. 2 is a top view, also partly sectional.

The entire housing of the cell is constructed of stainless steel. The cell comprises two circular electrodes 5, which are machined from electrolytic copper. For brewery use, the electrodes can be, for example, 16 cm. in diameter and 0.6 cm. thick with a central boss for making the electrical connections. The electrodes 5 are held in place, with a separation of for example 2.5 cm. by stainless steel discs 6, from which they are insulated by rubber discs 7. The stainless steel discs 6 are, in their turn, held firmly in place by threaded and notched rings 8, which can easily be unscrewed for cleaning and replacement of the electrodes. The entry and exit ports 9 and 10, respectively, of the electrode housing are tapered outwards in a plane parallel to the electrodes, and tapered inwards in a plane perpendicular to them, in such way as to preserve an approximately constant cross sectional area throughout the passage of the cell. The entire inner surface of the stainless steel housing together with the entry and exit ports is coated with an insulating layer of the synthetic resin which is known as Teflon (a registered trademark) to prevent any of the applied current from leaking across the housing.

Current from the regular 220 volt A.C. supply is conveniently applied to the electrodes by means of an assembly comprising a continuously variable transformer, rectifiers, and an ammeter (0 to 1 ampere graduated in 0.02 ampere divisions) to control the copper dosage. A table may readily be constructed to show the current required to give any desired copper dosage at any given beer velocity.

It is desirable to arrange for equal consumption of material from each of the two electrodes by reversing the direction of the current at uniform intervals, say, once daily by hand, or automatically at shorter intervals. If this is done some 300,000 to 400,000 hectolitres of beer may be treated before the electrodes are reduced to half their original thickness. The consequent reduction in their mechanical strength is of no account as the stainless steel retaining discs are themselves designed to withstand the internal pressure. The very slowly increasing separation between the electrode surfaces as their material is consumed has no effect on the functioning of the cell and can only be noticed as a very gradual increase in the voltage required to maintain a given current across the cell, due to the increasing thickness and electrical resistance of the beer layer.

The electrolytic dosage of copper may be carried out on beer that has been matured in the conventional way, i.e. by means of a slow secondary fermentation, but, of course, prior to the final filtration of the beer, or it may be used in connection with a shortening of the secondary fermentation. This shortening of the duration of secondary fermentation when carried out under conventional conditions must not be too drastic since in that case the maturation of the beer may be found unsatisfactory in other respects. In order to obtain the greatest possible advantage from the removal of hydrogen sulphide according to the invention it may be used in combination with methods of production in which the maturation of beer in other respects can be accelerated by procedures differing in one or other ways from the conventional procedure.

As an example of the effectiveness of the electrolytic treatment of a conventionally matured beer, which nevertheless still retained a considerable element of hydrogen sulphide in its aroma and taste, the following brewery trial is quoted. A portion of about 60 hectolitres of the beer was passed through the electrolytic cell, across which was passed an electric current sufficient to give a dosage of 0.03 p.p.m. copper, and the beer was then filtered and bottled. Next, the current across the cell was switched off and another 60 hectolitres of beer, untreated, was filtered and bottled as before. These electrolysed and control beers were then submitted to an expert taste panel and assessed by the well known "triangular taste-testing" method. Of 76 triangles submitted to the panel, 48 correctly indicated the odd sample, i.e. there was +++ statistical significance that the beers differed from each other in taste. Of the 48 correct triangles, 39 showed a preference for the electrolysed beer and 9 a preference for the control. There was thus a preference, again of +++ significance, for the electrolytically treated beer in virtue of its freedom from hydrogen sulphide, but no significant preference at all for the untreated beer.

If, as mentioned above, the slow secondary fermentation is to be accelerated this must, in particular, be done in such a way that the elimination of possible diacetyl (produced as a by-product during the primary fermentation) is achieved in a shorter time. This may be effected by conducting the secondary fermentation at a temperature range higher than that used in the conventional slow secondary fermentation; thus according to the invention, the temperature during the secondary fermentation may be in the range of about 4 to 8° C.; further, a relatively high concentration of yeast is used, for example, about 10 to 20 million cells per millilitre. Under these conditions the secondary fermentation is allowed to proceed for about one week instead of the more customary 6 to 10 weeks. This procedure will accelerate the maturation of the beer in all respects, except that the residual hydrogen sulphide will be more in evidence than would otherwise be the case. This, however, can be eliminated by the electrolytic process.

Preferably in connection with the acceleration of the secondary fermentation the two-yeast system is used, i.e. in the primary fermentation the wort to be fermented is divided into two portions which may, for example, be of equal volume and one of which, A, is fermented with a flocculent strain of pure yeast while the other, B, is fermented with a non-flocculent strain. At the end of these two primary fermentations the yeast in A will have settled out before the attenuation is completed while B will be completely, or nearly completely, attenuated with much yeast still remaining in suspension.

For the purpose of effecting the secondary fermentation the two fermented worts, A and B, are mixed together in the storage tanks: the yeast carried over from B will proceed to ferment the residual unfermented sugar in A. If necessary, more non-flocculent yeast may be added to bring its concentration to the above-mentioned level, suitable for the accelerated fermentation. After several days of relatively vigorous secondary fermentation under these conditions, generally in 4 to 12 days, the beer should be matured (and notably free from diacetyl aroma and flavour), though there may be too much residual hydrogen sulphide. The beer is therefore cooled, for example to about 0° C., and allowed to stand at this temperature for a few days, so that the yeast can settle out. It is then subjected, before the final filtration, to the electrolytic process which has been described to eliminate the residual hydrogen sulphide. In this way a matured beer is produced in a much shorter time than by the conventional process.

As an example, a beer which had been given an accelerated secondary fermentation in the brewery and then treated electrolytically before filtration and bottling was compared with the regular beer from the same brewery, i.e. conventional secondary fermentation without any subsequent electrolytic treatment. Of 68 triangular taste tests of these two products only 25 correctly indicated the odd sample, which implies that there was no statistically significant difference of taste between them. This was confirmed by the preferences expressed: 12 for the accelerated maturation followed by electrolytic treatment, and 13 for the conventional beer. As neither of these preferences reaches statistical significance it can be concluded that the accelerated process in combination with electrolytic treatment gave a beer not inferior in taste to the conventional procedure.

Brewery trials of the electrolytic treatment on altogether 6 beers (carried out in 4 different breweries), all of which had undesirably high levels of hydrogen sulphide, yielded the following overall result. Of 1018 triangular taste tests between the treated and control beers, 476 correctly indicated the odd sample, i.e. there was +++ statistical significance that the beers differed from each other in taste. Of the 476 correct triangles, 283 showed a preference for the electrolytically treated beers (+++ significance), and 193 for the control (no significance). The value of the electrolytic treatment in improving beer flavour is therefore empirically established.

Copper analyses of the electrolytically treated beers gave a mean figure of 0.20 copper in p.p.m., while the untreated control beers gave 0.17 p.p.m. The difference between these, 0.03 p.p.m., had also a standard error of ±0.03 so that it was, in fact, statistically insignificant. In conformity with this result, measurements of the stabilities of these beers showed that electrolytic treatment had no effect whatever, either on their chill haze, or their permanent haze. Similarly, their foam stabilities were entirely unaffected by the electrolytic treatment.

We claim:

1. The method of removing hydrogen sulphide from a fermented beverage selected from the group consisting of beer, cider and wine which comprises subjecting said beverage to electrolysis in the present of a copper anode to dissolve copper in said beverage in an amount substantially equivalent to at least a portion of hydrogen sulphide content in said beverage, whereby to precipitate said hydrogen sulphide as copper sulphide and thereafter filtering said beverage to remove said copper sulphide therefrom.

2. The method of claim 1, wherein said beverage is passed continuously between two electrodes of which at least the anode is copper, while applying an electric current across said electrodes and regulating the strength of said current in relation to the velocity of said beverage as it passes between said electrodes, whereby a portion of hydrogen sulphide contained in said beverage is precipitated as copper sulphide.

3. The method of claim 2 wherein said beverage is matured beer prior to its final filtration.

4. The method of claim 3, wherein said beer is subjected to an accelerated maturation prior to the removal of hydrogen sulphide by dissolution of copper therein.

5. The method of claim 1, wherein said beer is subjected to a second fermentation at a temperature in the range of 4–8° C. prior to the electrolytic dissolution of copper therein.

6. The method of claim 5, which comprises subjecting said beer to an accelerated second fermentation by the two-yeast system, prior to the electrolytic dissolution of copper therein.

References Cited

UNITED STATES PATENTS 493,809  3/1893  Becker _____ 99—48 X

FOREIGN PATENTS 274,225  7/1927  Great Britain.

LIONEL M. SHAPIRO, Primary Examiner

D. M. NAFF, Assistant Examiner

U.S. Cl. X.R.

99—31, 35; 204—139